United States Patent [19]
Dye et al.

[11] 4,286,000
[45] Aug. 25, 1981

[54] PLASTIC PREFORM

[75] Inventors: John F. Dye, Muncie; Earl L. Lowe, Winchester, both of Ind.

[73] Assignee: Ball Corporation, Muncie, Ind.

[21] Appl. No.: 88,229

[22] Filed: Oct. 25, 1979

[51] Int. Cl.³ .......................... B32B 3/02; B32B 1/04; B29C 23/00

[52] U.S. Cl. .................................... 428/64; 428/156; 428/192; 428/213; 428/518; 428/542; 428/66

[58] Field of Search ................ 428/64, 156, 174, 192, 428/542, 66, 518; 425/522, 523, 528, 133.1, 533, 529; 264/280, 285, 290, 291, DIG. 1

[56] References Cited
U.S. PATENT DOCUMENTS

| | | | |
|---|---|---|---|
| 3,471,896 | 10/1969 | Ninneman | 425/529 |
| 3,488,805 | 1/1970 | Biglin et al. | 425/526 |
| 3,634,182 | 1/1972 | Biglin | 428/192 |
| 3,947,204 | 3/1976 | Ayres et al. | 425/384 |
| 4,005,967 | 2/1977 | Ayres et al. | 425/326.1 |

Primary Examiner—Paul J. Thibodeau
Attorney, Agent, or Firm—Gilbert E. Alberding

[57] ABSTRACT

A preformed plastic structure for making open-mouth plastic containers is disclosed. The structure is an oriented preform having a base defined by an inner circular portion and an outer circular portion situated parallel to the outer circular portion and spaced therefrom. The radius of the outer circular portion is larger than the radius of the inner circular portion. The preform is further provided with an outwardly extending annular member integral with the base and tapering therefrom, the member forming an angle of between about 2° to about 30° from the base, and a flange integral with the annular member and extending radially outwardly and having a cross-section configuration of substantially the rim of the finished container. The preform is well suited for forming multilayered containers.

11 Claims, 5 Drawing Figures

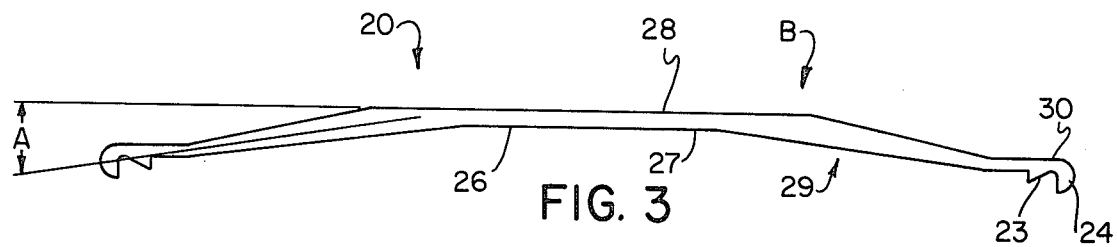
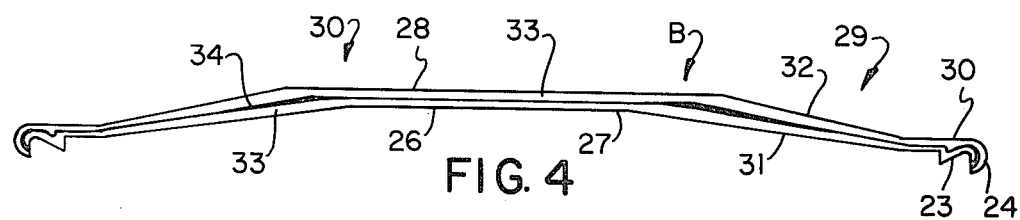
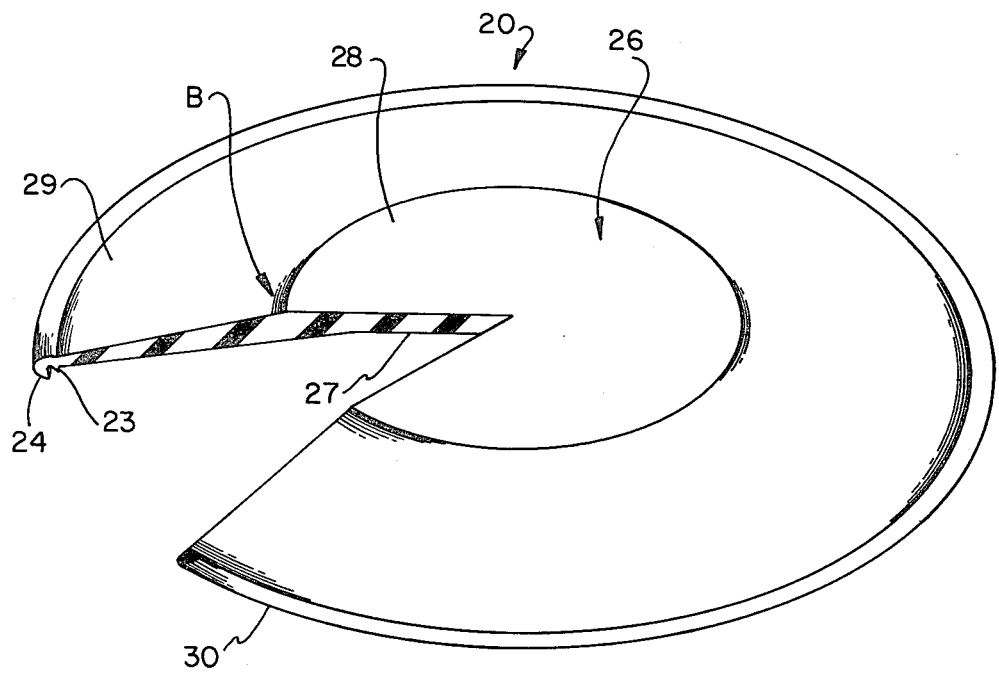

PLASTIC PREFORM

BACKGROUND OF THE INVENTION

This invention relates to a preform of novel configuration and relates, most particularly, to a preform having an improved unitary structure that is readily deformable into a container. The preform is further characterized by being made from orientable polymeric materials either of a single layer or comprising a number of layers.

DESCRIPTION OF THE PRIOR ART

The subject invention is an improvement over the prior art preform configurations. The subject preform provides a predetermined material distribution so that there is a finite reservoir of material to provide uniform wall properties upon extension or drawing of the entire structure in the production of containers. The importance of an even and uniform distribution of materials upon drawing in forming the container is more pronounced and difficult with structures having more than one layer, i.e., multilayered structures. When certain polymers are employed, the subject invention permits the production of biaxially oriented thermoplastic containers having uniform wall thickness.

The preforms herein described are to be distinguished over those preforms that are formed via injection molding from molten polymeric materials. In general such molded forms do not lend themselves to forming oriented structures. Moreover, the formation of multilayered structures is not readily accomplished by injection molding processes.

In a process of scrap free or scrapless forming thermoplastic blanks are made by simply requiring sectionalization to form definite polygonal shapes whereby no scrap is generated. Generally a large sheet is severed into a multiplicity of rectangular shaped blanks. This is in contrast to cutting out circular forms or other irregular shapes from a thermoplastic sheet stock whereby scrap pieces are readily obtained. The scrap itself does not present any problem when one employs a single type of polymeric material, that is, a single-layered thermoplastic material. By using only one material, scrap so generated from the unused portions can be readily incorporated back into the process and be easily utilized. However, with multilayered structure of different polymeric material, this cannot be done due to the difference in materials used.

In a scrapless forming process blanks are subsequently forged into preforms. In effect, the blanks are gently heated by bringing them to a temperature in a range from just above their softening point to just below their melting point and thereafter forging the same under ample force and in a heated mold configuration to stretch the blanks into predetermined preforms. By this process the thermoplastic blanks are given substantial molecular orientation. It will be appreciated that such orientation is carried into the finished containers by the aforementioned forging step of the blanks. Simply, the high degree of orientation is accomplished by the forging when the blank is forged below the melting point of the blank.

The process of making a sheet having a plurality of layers is well-known and described by a number of patents, including U.S. Pat. No. 3,476,627 to Squires; U.S. Pat. No. 3,479,425 to Lafevre; U.S. Pat. No. 3,557,265 to Chisholm, et al; and U.S. Pat. No. 3,959,431 to Nissel.

The process of making forged preform is disclosed in U.S. Pat. Nos. 3,739,052; 3,947,204; 3,995,763 and 4,005,967 to Ayres, et al; U.S. Pat. No. 4,014,970 to Jahnle; and U.S. Pat. No. 3,757,718 to Johnson.

A number of patents disclose various preform configurations that are useful for making plastic containers and include U.S. Pat. No. 3,184,524 to Whiteford; U.S. Pat. Nos. 3,298,893 and 3,341,644 to Allen; U.S. Pat. No. 3,471,896 to Ninneman; and U.S. Pat. Nos. 3,488,805 and 3,634,182 to Biglin, et al.

An object of this invention is the formation of a preform article of manufacture that will provide uniform plastic material distribution throughout the walls of the container after further molding processes.

Another object of this invention is to provide a novel plastic forged article that can be further drawn into a finished container, the article and finished container maintaining the entire multilayered structure.

Another object of this invention is to provide a multilayered plastic preform body that has a high degree of biaxial orientation.

Another object of this invention is to provide a novel multilayered preform that may be readily stretched or blowmolded into an open mouth container without any stress whitening of the layered structure.

Another object of this invention is the provision for a multilayered preform of special configuration and having improved performance properties that can undergo uniform stretching during subsequent molding operations.

These and other objects of the invention will become more readily apparent from review of the specification claims and a study of the attached drawings.

SUMMARY OF THE INVENTION

According to the present invention, an oriented preform is formed of functionally different integral sections of different thicknesses by forging techniques. More particularly, an oriented preform for making an open mouth container is disclosed having a base defined by an inner circular portion provided with a predetermined radius and an outer circular portion situated parallel to said inner circular portion and spaced therefrom, said outer portion having a greater radius than said base, an annular member connected to an integral with said base, said member tapering therefrom and having its greater thickness adjacent the circumference of said inner and outer circular portion, said annular member forming an angle of inclination with said base, and a flange integral with the annular member and extending radially outwardly and having a cross-section configuration of substantially the rim of a finished container.

BRIEF DESCRIPTION OF THE DRAWINGS

FIG. 3 is an enlarged sectional view showing the desired configuration of a parison of the subject invention;

FIG. 4 is also an enlarged sectional view like FIG. 3 but having a layered structure therethrough; and FIG. 5 is an isometric view of the parison in accordance with this invention.

DETAILED DESCRIPTION

Figure 1:
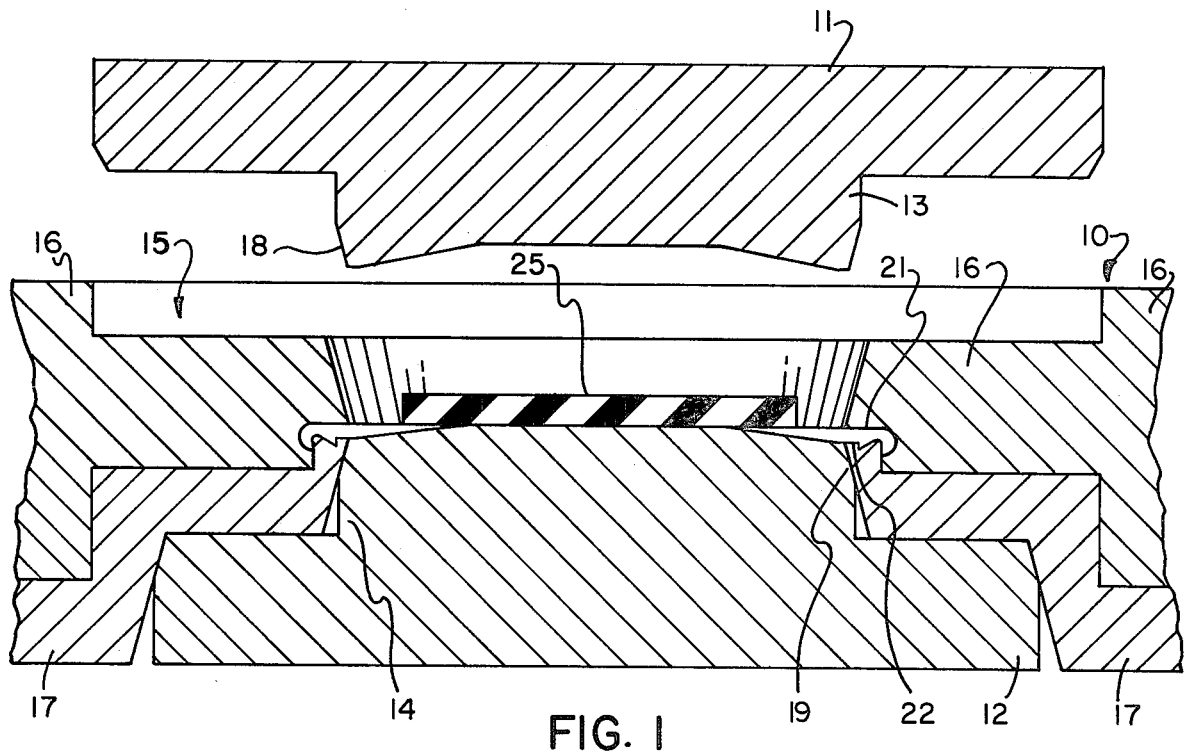
FIG. 1 is a diagrammatic, cross-sectional view of a forging press.
Figure 2:
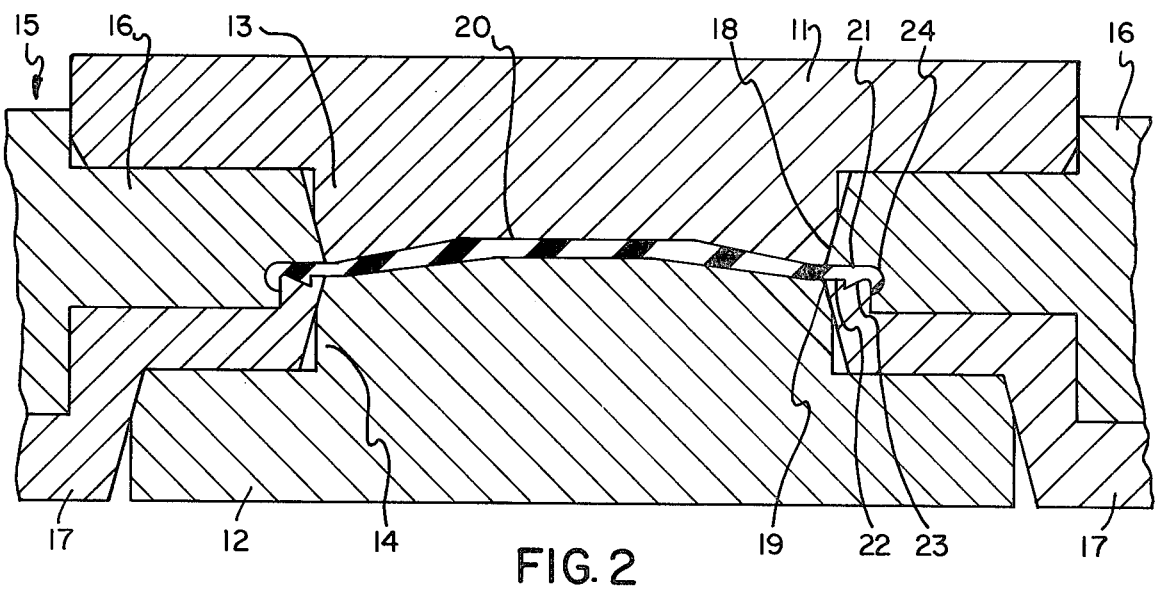
FIG. 2 is similar to FIG. 1 showing the relationship of the parts after the blank is forged into a preform.

Referring now to the drawings and, in particular, to FIGS. 1 and 2, a forging press 10 is shown having an upper ram 11 and a lower stationary ram 12. The press 10 depicts one of the apparatus that can be used to make a plastic preform in accordance with the dimensions and design of the subject invention. The upper ram 11 may be guided by any conventional mean (not shown) for reciprocation. It will be noted that the upper ram 11 is provided with an upper platen 13 integrally affixed to the ram 11 and, in a like manner, the lower stationary ram 12 is provided with a lower platen 14. Affixed to the lower platen 14 is a forming fixture 15. Although not shown in the drawings the upper and lower platens 13 and 14, respectively, are provided with conventional heating means such as steam or hot fluid-carrying channels therein. Further, the forming fixture 15 is provided with a cooling means (not shown) such as a separate conduit and circumferential channels within the fixture 15 to transport a cooling liquid therethrough.

The forming fixture 15 comprises a first clamping ring 16 and a second clamping ring 17. As for the first clamping ring 16, it is contoured at 18 to match an upper chamfered surface 18 of upper platen 13 and, in a like manner, the second clamping ring 17 is chamfered to match a lower chamfered surface 19 of the lower platen 14. Both the first and second clamping rings 16 and 17, respectively, are provided with conventional circumferential cooling channels (not shown) as previously mentioned. The first clamping ring 16 is provided with a first shoulder 21; the second clamping ring 17 is likewise provided with a second shoulder 22, said shoulders providing a rim forming portions for a preform 20. As better seen in FIG. 2, these two shoulders 21 and 22 cooperate in an engaging manner to firmly clamp the preform 20 and, in particular, an inclined face 23 and bead 24 thereof. It will be readily appreciated that the shape is such that the preform will not pull out of the forming fixture 15 when the platen 13 is removed. Moreover, the shape of the shoulders is such that a finished molded lip is formed about the rim of the preform.

Referring now to FIGS. 3, 4, and 5, there is depicted the preform 20 of the instant invention comprising a base 26 defined by an inner circular portion 27 and an outer circular portion 28, the inner and outer portions being parallel or substantially parallel to one another. Further, the outer circular portion 28 is provided with a greater radius than the inner portion 27. The outer circular portion 28 is so designed as to have a greater thickness B, especially immediately adjacent said outer circular portion. In particular, the preform is structured to slope inwardly at a predetermined angle A, FIG. 3, the angle being generally between about 2° and 30° from the horizontal. This structure defines a tapering section or annular member 29. Integrally connected to said member 29 is a flange 30 that is provided with a bead 24 and an inclined face 23, these latter two structures making up the rim of a finished container.

In a method of making a preform, a blank 25 is generally lubricated and preheated to a temperature ranging just above the softening point to below the melting point of the material, and this is then placed on the lower platen 14. The upper ram 11 then is allowed to descend under pressure to forge the heated blank 25 into the cavity between the platens 13 and 14 in a configuration as shown in FIGS. 3, 4 and 5. The upper and lower platens 13 and 14 are heated to a forging temperature, generally above the softening point of the material being forged. The temperature of the platens and the blank can be the same or different but it is preferred to have the platens at a slightly higher temperature than the blank. A preform made in accordance with this invention can be most readily thermoformed into an open-mouth container having uniform sidewalls and structural integrity.

The invention may be constructed of various materials. In particular, the invention is applicable to the use of a single plastic such as polyolefin, including polyethylene, polypropylene, etc., and polyvinyl aromatics such as polyesters, polystyrenes as well as polyvinyl halides such as polyvinyl chlorides. Moreover, an essential aspect of the subject invention is the structural features of the preform itself, in that it readily is formable into multilayer articles, including open-mouth containers. For example, a multilayer material may consist of polyvinyl aromatics such as styrene, polyvinyl toluene, or rubber modified blends thereof with a core 34 of polyvinylidene chloride. A further useful multi-multilayered material may consist of polyethylene or polypropylene with a core of polyvinylidene chloride. Containers formed with a polyvinylidene chloride layer are excellent barriers to gases such as oxygen and carbon dioxide.

It will be appreciated from the polymeric materials used and the conditions under which the preform is formed that a considerable degree of orientation is built into a given container through the forging of the preform. In a like manner when a preform is forged below the softening point of a blank, a high degree of orientation is formed in the container.

The particular configuration of the subject invention allows a uniform multilayered profile when multilayered preforms are thermoformed into a given container design. This follows from the novel structure of the preform itself in that all of the layers transverse the preform so formed extends outermost to the extremes of the bead section of the preform. Also, the distribution of polymeric material is so situated that thermoforming any design of container allows a uniform thickness of the side walls. In this regard the structure of the preform is critical in having the radius of the outer circular portion 28 larger than the radius of the inner circular portion 27. Generally, the ratio of radius of the inner circular portion to the outer circular portion should be less than 1, and preferably between about 0.50 and 0.95. Moreover, the long lead surface of the inner circular portion 31 is important in offering a substantial reservoir of material. In general, it has been found that this length should be equal to or greater than the radius of the inner circular portion 27.

The embodiments of this invention disclosed in the drawings and specification are for illustrative purposes only, and it is to be expressly understood that said drawing and specification are not to be construed as a definition of the limits or scope of the invention, reference being made to the appended claims for that purpose.

What is claimed is:

1. An oriented polymeric preform for making an open mouth container comprising a base defined by an inner circular portion having a predetermined radius and an outer circular portion situated parallel to said inner circular portion and spaced therefrom, said outer portion having a greater radius than said inner portion, an outwardly extending annular member integral with said base and tapering therefrom, said member having a thickness adjacent the circumference of said inner and outer circular portions which is substantially greater than any other portion of the preform so as to offer a reservoir of polymeric material, said annular member forming an angle of inclination with said outer circular portion of between about 2° to about 30°, and a flange integral with the annular member and extending radially outwardly and having a cross-section configuration of substantially the rim of the finished container.

2. An oriented preform as recited in claim 1 wherein the preform is a multilayered structure.

3. An oriented preform as recited in claim 1 wherein the angle of inclination is between about 5° to about 15°.

4. An oriented preform as recited in claim 1 wherein the ratio of the radius of said outer circular portion to the radius of said inner circular portion is within a range of between about 1 to 0.75 to 1 to 0.97.

5. An oriented multilayered polymeric preform for making an open mouth container comprising a base defined by an inner circular portion having a predetermined radius and an outer circular portion having a greater radius and situated parallel to said inner circular portion and spaced therefrom, said outer portion having a ratio of the radius of the outer circular portion to the radius of the inner circular portion of less than 1 to 0.50, an outwardly extending annular member integral with said base and tapering therefrom, said member having its greater thickness adjacent the circumference of said inner and outer circular portions, said annular member forming an angle of inclination with said outer circular portion of between about 2° to about 30°, and a flange integral with the annular member and extending radially outwardly and having a cross-section configuration of substantially the rim of the finished container.

6. An oriented multilayered preform as recited in claim 5 wherein one of the layers is an oxygen barrier.

7. An oriented multilayered preform as recited in claim 6 wherein the barrier is polyvinylidene chloride.

8. An oriented multilayered preform as recited in claim 5 wherein the angle of inclination of said annular portion is between about 5° and 20°.

9. An oriented multilayered preform as recited in claim 8 wherein the angle of inclination is about 10°.

10. An oriented multilayered polymeric preform comprising an inner and outer circular base section, the radius of said outer section being larger than the inner base section, an annular member connected integrally to said inner and outer circular base sections and having a thickness adjacent the circumference of said inner and outer circular portions which is substantially greater than any other portion of the preform so as to offer a reservoir of polymeric material, said annular members forming an angle with the outer circular base of between about 2° and 30°, and a flange integral with the annular member and extending outwardly, said preform including an oxygen barrier layer of polyvinylidene chloride disposed between outer layers of polyolefin.

11. An oriented multilayered preform as recited in claim 10 wherein the polyolefin is a member selected from the group consisting of polyethylene, polypropylene and polybutylene.

* * * * *